Sept. 29, 1970        G. G. BRUBAKKEN        3,530,613
RODENT TRAP
Filed Jan. 23, 1969
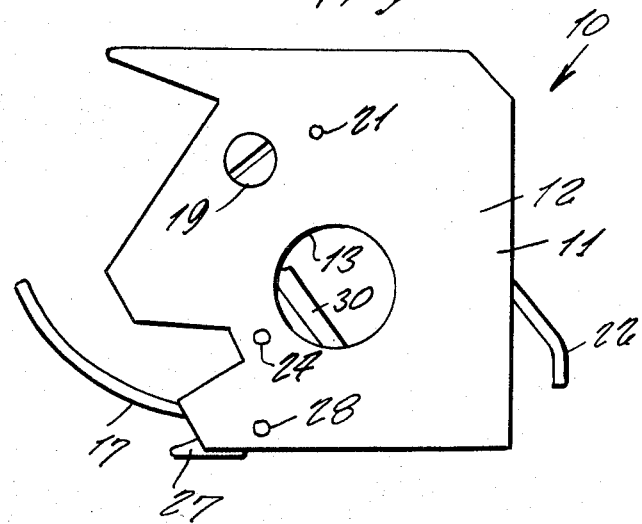
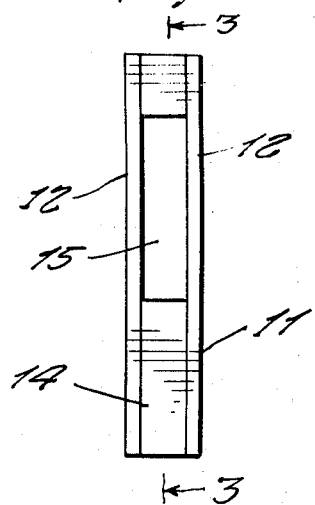
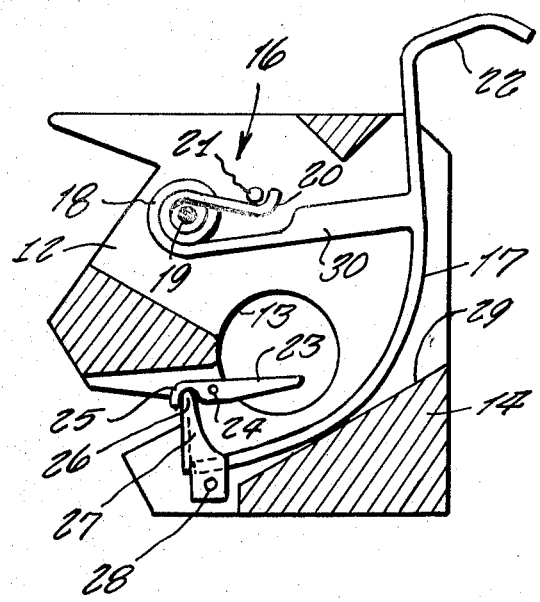
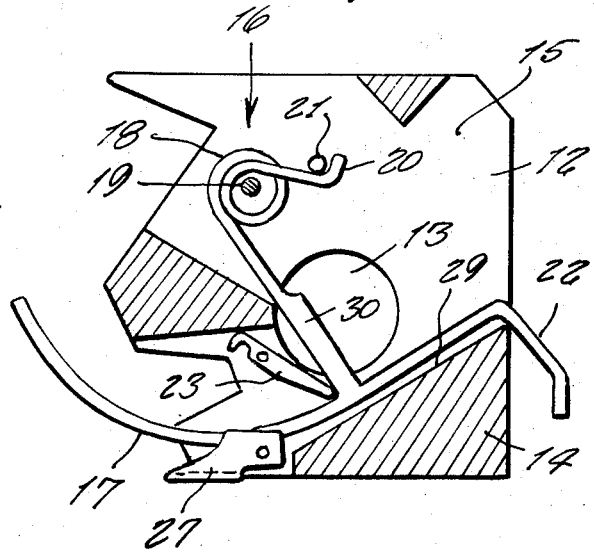
INVENTOR
GARDNER G. BRUBAKKEN

United States Patent Office 3,530,613
Patented Sept. 29, 1970

3,530,613
RODENT TRAP
Gardner G. Brubakken, 501 8th Ave.,
Two Harbors, Minn. 55616
Filed Jan. 23, 1969, Ser. No. 793,361
Int. Cl. A01m 23/30
U.S. Cl. 43—85                                1 Claim

ABSTRACT OF THE DISCLOSURE

An improved trap for mice and other small animals of rodent type, the trap comprising a housing having an opening through opposite sides thereof, the opening having a portion thereof intercepted by a trip-plate which when activated by a mouse passing through the openings, will throw a death spring across the opening to kill the animal during movement therethrough.

---

This invention relates generally to animal traps. More specifically it relates to traps for rodents and the like.

It has been observed that in the catching of mice and similar rodents that they become trap shy of a trap placed along their usual runways and routes along which they travel, and that after a few are caught in the trap, thereafter they start going around the traps. It has been further observed that mice and such animals appear to have the habit that if there is an opening in their path, they will invariably crawl through it. With this latter observation, this feature if incorporated in a trap would eliminate the trap shyness of these animals. Actual experiments have proven this theory to be correct.

Accordingly it is a principal object of the present invention to provide an improved rodent trap for catching mice, rats and the like, and wherein the trap includes an opening therethrough so as to attract the rodents therethrough.

Another object of the present invention is to provide a rodent trap incorporating a death-spring which is activated by a trip-plate intercepting the opening and wherein the movement of a mouse through the opening will activate the trip plate so as to throw the death spring that will seize the animal and kill it.

Still another object of the present invention is to provide a rodent trap which will destroy the animal even if its head only is entered through the opening.

Yet another object of the present invention is to provide a rodent trap which can be set with minimum effort by simply lifting a protruding lever handle.

Still a further object is to provide a rodent trap which unlike conventional rodent traps makes it impossible for a person's fingers to get snapped while setting the device.

Yet a further object is to provide a rodent trap which can be made on any scale so that it can be used for catching larger animals such as weasels, minks and the like.

Other objects of the present invention are to provide a rodent trap which is simple in design, inexpensive to manufacture, rugged in construction, easy to use and efficient in operation.

These and other objects will be readily evident upon a study of the following specification and the accompanying drawing wherein:

FIG. 1 is a front elevation view of the present invention;

FIG. 2 is an end elevation view thereof;

FIG. 3 is a cross-sectional view taken on the line 3—3 of FIG. 2 and showing the trap in a sprung position; and FIG. 4 is a similar view thereof shown in a loaded position.

Referring now to the drawing in detail, the reference numeral 10 represents a rodent trap, according to the present invention, wherein there is a housing 11 comprised of opposite end walls 12 each of which is provided with an opening 13 therethrough, the openings being in alignment with each other. Spacers or blocks 14 between the walls 12 serve to form a compartment 15 between the wall 12, the compartment containing a spring mechanism 16.

The spring mechanism 16 includes a death spring 17, the death spring being integral with a coil spring element 18 at one end thereof, the coil spring element being fitted around the body of a screw 19 used for securing the end walls 12 together, the terminal end of the coil spring element comprising a hook 20 that is hooked about a transverse extending pin 21 extending between the walls 12 as shown in the drawing. The coil spring element 18 serves to provide the driving force for moving the death spring 17 from the position shown in FIG. 4 to the position shown in FIG. 3. The death spring further includes a lever handle 22 which protrudes outwardly of the housing so that it may be manually grasped by a person's fingers and raised into an uplifted position as shown in FIG. 4 so as to load or set the mechanism. The spring mechanism 16 further includes a trip-plate 23 which extends partly across the opening 13 so as to be manually operated by the rodent attempting to crawl through the opening. The trip plate is centrally pivotable about a pin 24 secured to the housing, the opposite end of the trip plate having a hook 25 which serves to grasp the projection 26 of a spring lock 27 that is pivotable about a transverse pin 28 secured to the housing.

In operative use, the rodent trap is set by simply lifting the lever handle 22 from the position shown in FIG. 3 to the position shown in FIG. 4, thus causing the death spring to become spring loaded by the action of the coil spring element 18 which normally urges the death spring to be returned toward the position shown in FIG. 3. When thus set, the trip plate thus extends across the opening 13 as shown in FIG. 4. When a rodent attempts to crawl through the opening 13, he pivots the trip plate 23 downwardly about the pin 24 thus causing the hook 25 to disengage from the projection of the spring lock 27. When this occurs, the pressure force from the coil spring element 18 urges the death spring 17 to pivot in a clockwise direction, thus throwing the spring lock 27 downwardly about the pin 28, the death spring moving until it abuts with the edge 29 of the spacer 14. The arm 30 of the death spring during this course of travel moves across the opening 13 thereby crushing or squeezing to death an animal located in its path.

Obviously various mechanical refinements may be added to the construction such as a bushing around the bolt 19 and various other mechanical refinements.

What I now claim is:

1. In a rodent trap, the combination of a housing, said housing having self contained means to invite a rodent to pass therethrough, and said housing having a spring mechanism within said housing for squeezing to death said rodent when it attempts to pass through said housing, said housing comprising a pair of parallel spaced apart opposite walls, each of said walls having an opening therethrough, said openings of said walls being in axial alignment with each other, and said walls being maintained in spaced relation from each other by means of a plurality of spacers therebetween, said walls and said spacers defining a central compartment within which said spring mechanism is contained, said spring mechanism comprising a death spring, said death spring comprising a generally arcuate element having an integral arm extending therefrom, the terminal end of said arm being integral with a coil spring element positioned around a bolt extending transversely through said housing and being secured within said opposite walls, the terminal end of said coil spring element having a hook which is anchored about a transverse pin secured between said walls, one end of said spring extending outwardly of said housing and comprising a lever handle, and the opposite end of said death spring comprising an end engageable with a spring lock mechanism, said spring lock mechanism comprising a spring lock lever pivotable at one end about a transverse pin mounted in said housing, and an opposite end of said spring lock lever comprising a projection engaged by a hook at one end of a trip plate centrally pivotable about a pin secured in said housing, the opposite end of said trip plate intercepting said openings of said housing when in a cocked position.

References Cited
UNITED STATES PATENTS

| | | | |
|---|---|---|---|
| 901,851 | 10/1908 | Thompson | 43—85 |
| 2,242,648 | 5/1941 | Rocca | 43—85 |
| 2,427,148 | 9/1947 | Luckton | 43—85 |

WARNER H. CAMP, Primary Examiner